Jan. 1, 1952     P. GRIVET ET AL     2,580,675
CORRECTION DEVICE FOR MICROSCOPES OF THE
REFLECTION MIRROR TYPE
Filed June 16, 1948
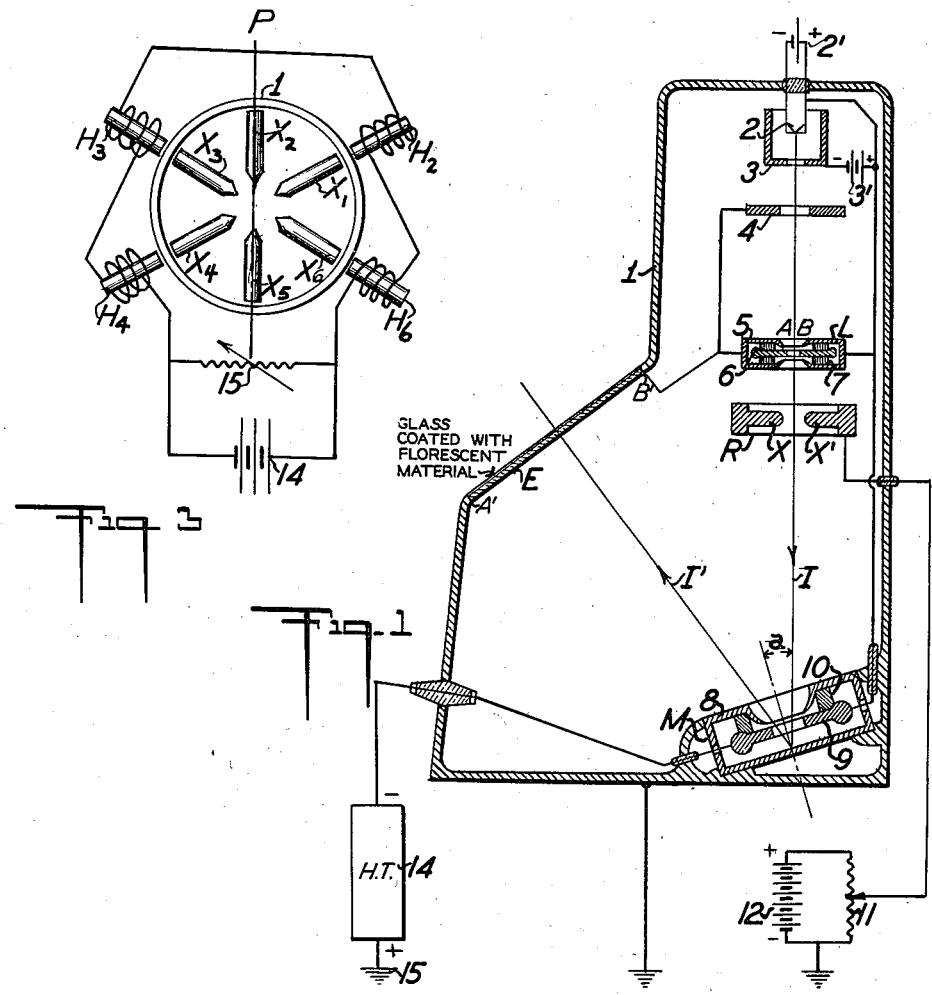
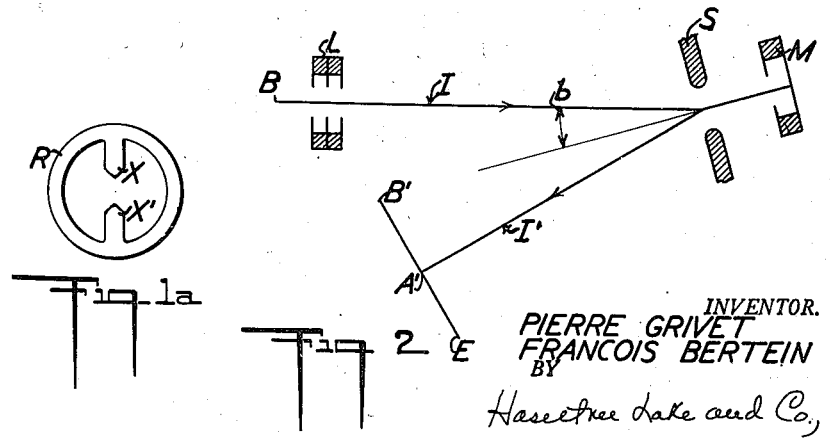
INVENTOR.
PIERRE GRIVET
FRANCOIS BERTEIN
BY
AGENTS Patented Jan. 1, 1952

2,580,675

UNITED STATES PATENT OFFICE 2,580,675

CORRECTION DEVICE FOR MICROSCOPES OF THE REFLECTION MIRROR TYPE

Pierre Grivet and François Bertein, Paris, France, assignors to Compagnie Generale de Telegraphie Sans Fil, a corporation of France Application June 16, 1948, Serial No. 33,263
In France June 26, 1947

4 Claims. (Cl. 250—49.5)

The present invention relates to electronic or ionic optical instruments using at least one mirror.

The use of a mirror in this type of apparatus, for example in an electronic microscope, in place of a projection lens, offers the advantage of shortening the tube of the apparatus since the electronic beam is folded back upon itself. Furthermore, since the aberrations due to mirrors can be subtracted from those due to lenses, it is theoretically possible, by such substitution of a mirror for a projection lens, to reduce the limit of aberration which defines the separating or discriminating power of the instrument.

An electronic mirror, however, introduces a certain difficulty of assembly. The screen or photographic plate intended for receiving the image thrown by the instrument must not interrupt the beam prior to its incidence on the mirror. With this end in view, it is necessary either to pierce the screen or to arrange it outside the axis of the beam, according to whether or not it is desirable to preserve axial symmetry. The screen must therefore be pierced if it is to be arranged normal to the axis of the beam, but if it is arranged outside the axis this introduces new aberrations due to the slight inclination of the rays, and these cannot be neglected.

The object of the invention is to remove these disadvantages and to introduce new methods of mounting electronic mirrors off center. This enables the screen to be located outside the incident beam.

It is a further object of the invention to correct the aberrations introduced by such off-setting by the use of a compensatory arrangement of suitable electrodes.

The invention will be more readily understood as this description proceeds, when reference is made to the accompanying drawings illustrating, merely by way of example, two embodiments of the invention, and in which:

Fig. 1 shows in sectional view an arrangement according to which the mirror is located on the axis of the lens with a correcting device in the vicinity of the lens;

Fig. 1a shows, in frontal view, the correcting device R of Fig. 1;

Fig. 2 shows a different embodiment according to which the mirror is located outside the axis of the lens with a correcting device in the vicinity of the mirror acting both on the incident rays and on the reflected rays; and Fig. 3 shows a plan view of the correcting device of Fig. 2.

The sectional view of Fig. 1 shows, in succession inside the gas-tight enclosure 1, the cathode 2 supplied with heating current from the source 2', the control electrode 3 negatively polarized by battery 3', the accelerating anode 4, the objective lens L comprising a grounded external electrode 5 connected to the mass, an internal electrode 6 connected to the source HT of high negative potential, and an annular insulator 7 separating the electrodes 5 and 6, the correcting device R according to the invention with electrodes X and X', the electronic mirror M, located in the axis of propagation I and having its axis inclined thereto by an angle $a$, and comprising a grounded external electrode 8, and an internal electrode 9 connected to the source HT and supported by insulating ring 10.

Correcting device R is charged with an adjustable potential through rheostat 11 connected to battery 12.

A fluorescent screen E, in a plane perpendicular to axis I' which is inclined to axis I by an angle $2a$, receives the image A'B' of object AB.

Referring now to Fig. 2, an electronic mirror M is located outside the axis of electronic lens L and at an angle thereto. A correcting device S, capable of creating a deviating magnetic field, is so arranged that the beam I coming from the lens L is rotated through an angle $b$ and is incident on mirror M normal thereto. Reflected beam I' is deviated in the opposite direction an equal amount and is therefore at an angle $2b$ to the incoming beam I. Hence the screen or plate E is again located outside the axis of the incident beam.

In this embodiment, mirror M operates as though it were centered on the axis of the beam, i. e. in the best possible conditions. As a consequence of this arrangement the optical aberrations due to correcting device S can be neglected. This allows the use of larger angles of deviation $2b$ than in the previous embodiment without adversely affecting the image.

The construction of a device S according to Fig. 2 is, however, more complicated than device R. Device S, for example, may be made of six soft iron bars $X_1, X_2 \ldots X_6$ arranged at the points of a star centered on the axis of the lens or of the mirror, according to Fig. 3, wherein P is the plane of symmetry of the microscope seen in a plan view of Fig. 2. These bars may have dimensions of the order of the rods of the electrostatic device R. $X_1, X_3, X_4$ and $X_6$ are energized by inductors $H_1, H_3, H_4$ and $H_6$, the windings of which are similarly arranged and traversed by the same current $i$ in one direction for $X_1$ and $X_6$ and in the opposite direction for $X_3$ and $X_4$.

Current $i$ may be obtained from an outside source 14 and the adjustable resistor 15 of low intensity since the excitation of each winding is of the order of at most 1 amp./turn.

It should be noted that the source of supply of the correcting device must be of a certain constancy, otherwise the image A'B' would not be motionless. This constancy should be maintained with an accuracy of the order of 1/10,000 or at least 1/1,000.

The assembly of the correcting device on the body of the instrument is most advantageously carried out by means of rings made of plastic material, the leads being preferably shielded. In the magnetic correcter of Fig. 3, each core X may be located inside the instrument while the corresponding inductor I may be in the extension of the core but outside the instrument.

It is also possible to arrange the correctors of either embodiment in accordance with Figure 9 of United States patent application filed March 13, 1947 and which is now U. S. Patent No. 2,547,994, in such manner as to correct simultaneously the aberration due to the ellipticity of the lenses, but this may introduce an additional complication. In the first embodiment, for example, it is possible to add to device R two more electrodes similar to X and X' arranged similarly but shifted relatively thereto about 45° around axis I and subjected to a voltage V' adjustable independently of V.

The embodiments, shown by way of example, do not in any way restrict the general character of the invention which may be used in any electronic or ionic device comprising beams and mirrors. Neither is there any limit as to the number, form, arrangement or location of the correcting electrodes. Known electrodes may be used, for example, and the correcting effect, which may be obtained by using movable electrodes to which a constant tension is applied, may be either electrostatic or magnetic, in which case the electrodes are replaced by magnetized rods or cores or by magnetizing coils or a combination of the two.

What we claim is:

1. In an electronic microscope, the combination comprising an electron beam producing means, a lens constituting an objective of the microscope located in the path of the beam, a mirror positioned for receiving and reflecting the incident beam and inclined relatively to the axis of said beam, a system of electrodes arranged beyond said lens in a plane perpendicular to the axis of the incident beam and symmetrical with respect to said axis and when energized acting to correct aberrations introduced by the inclination of the mirror, and means for applying a suitable tension to said electrodes.

2. In an electronic microscope, the combination comprising an electron beam producing means, a lens constituting an objective of the microscope located in the path of the beam, a mirror positioned for receiving and reflecting the incident beam and inclined relatively to the axis of said beam, a system of electrodes arranged beyond said lens in a plane perpendicular to the axis of the incident beam and symmetrical with respect to said axis and when energized acting to correct aberrations introduced by the inclination of the mirror, and of an adjustable source of tension connected to said electrodes in such manner as to supply thereto a tension substantially lower than the acceleration potential of the electrons.

3. In an electronic microscope, the combination comprising an electron beam producing means, a lens constituting an objective of the microscope located in the path of the beam, a mirror positioned for receiving and reflecting the incident beam and inclined relatively to the axis of said beam, a system of electrodes arranged in close proximity to said mirror, on the path of the incident beam and in a plane parallel to the plane of the mirror, and means by which said electrodes exert a magnetic effect on the beam shape to correct aberrations introduced by the inclination of the mirror.

4. In an electronic microscope, the combination comprising an electron beam producing means, a lens constituting an objective of the microscope located in the path of the beam, a mirror positioned for receiving and reflecting the incident beam and inclined relatively to the axis of said beam, a system of electrodes arranged in close proximity to said mirror, on the path of the incident beam and in a plane parallel to the plane of the mirror, said system comprising a plurality of soft iron rods arranged in star formation inside an airtight enclosure containing said microscope and symmetrically with respect to the axis of said mirror, and a plurality of inductors arranged outside said enclosure and comprising similarly arranged windings and a source of current supply connected to said inductors in such manner as to feed current in opposite directions through the windings located on opposite sides of the plane containing the axes of the incident and reflected beams.

PIERRE GRIVET.
FRANÇOIS BERTEIN.

REFERENCES CITED

The following references are of record in the file of this patent:

UNITED STATES PATENTS

| Number | Name | Date |
|---|---|---|
| 2,103,645 | Schlesinger | Dec. 28, 1937 |
| 2,115,093 | Von Ardenne | Apr. 26, 1938 |
| 2,126,286 | Schlesinger | Aug. 9, 1938 |
| 2,163,787 | Henneberg | June 27, 1939 |
| 2,264,709 | Nicoll | Dec. 2, 1941 |
| 2,332,876 | Uhlmann | Oct. 26, 1943 |
| 2,401,315 | Ramberg | June 4, 1946 |
| 2,453,647 | Van Overbeek | Nov. 9, 1948 |